(12) United States Patent
Lee

(10) Patent No.: US 6,922,525 B2
(45) Date of Patent: Jul. 26, 2005

(54) CAMERA AND MODULAR LENS SYSTEM

(75) Inventor: Steven K. Lee, Edina, MN (US)

(73) Assignee: VPR Matrix, Inc., Richfield, MN (US)

(*) Notice: Subject to any disclaimer, the term of this patent is extended or adjusted under 35 U.S.C. 154(b) by 0 days.

(21) Appl. No.: 10/876,832

(22) Filed: Jun. 25, 2004

(65) Prior Publication Data
US 2005/0031327 A1 Feb. 10, 2005

Related U.S. Application Data

(60) Provisional application No. 60/482,636, filed on Jun. 26, 2003.

(51) Int. Cl.[7] ............................. G03B 9/02; G03B 13/32
(52) U.S. Cl. ........................... 396/71; 396/144; 396/505
(58) Field of Search ........................... 396/71, 89, 137, 396/144, 505–510, 147, 529–530; 351/140, 141; 348/345, 360; 359/823–825; 352/140, 141

(56) References Cited

U.S. PATENT DOCUMENTS

| | | | | |
|---|---|---|---|---|
| 3,968,504 A | * | 7/1976 | Komine | 396/71 |
| 4,518,329 A | * | 5/1985 | Weaver | 417/566 |
| 4,802,738 A | * | 2/1989 | Ando et al. | 359/827 |
| 5,327,188 A | * | 7/1994 | Kohmoto | 396/103 |

* cited by examiner

Primary Examiner—W. B. Perkey

(57) ABSTRACT

A control module between to a lens barrel and a camera body contains a focus driver and an iris and associated aperture control. The control module interacts electronically and mechanically with the camera body and the lens barrel to position lens systems within the barrel.

2 Claims, 4 Drawing Sheets

CAMERA AND MODULAR LENS SYSTEM

This application claims priority to U.S. Ser. No. 60/482,636, filed Jun. 26, 2003.

FIELD OF THE INVENTION

The present invention relates to a camera system with separable lens barrels, and more particularly to a control module intermediate between a camera body and a lens barrel.

BACKGROUND OF THE INVENTION

Camera and lens systems are well known and come in a variety of configurations for the consumer. These configurations include lens systems attached to the camera and cameras with interchangeable lens systems. Cameras with fixed lenses can include point-and-shoot type fixed focal length lenses or zoom lenses of variable focal length. Advantages of such systems are that they are easy to use and come in compact packages. Disadvantages of such systems include relatively lower quality optics or limited zoom capability. Cameras with interchangeable lenses are often known as, but not limited to, single lens reflex cameras. Such cameras include both film and digital type image media. Many interchangeable lenses, while generally only compatible with a particular camera manufacturer, can be used on both film and digital cameras of the same manufacturer.

Interchangeable lenses come in various types. The lenses can include various fixed focal length and zoom ranges. They can include optics of very high quality or less than high quality. Also, they can include various maximum apertures. Accordingly, cameras designed to use interchangeable lenses have available almost every type of interchangeable lens for their needs.

Interchangeable lenses of the related art all include several systems. Each lens includes an optical system which is at least one, but often several lens elements that are arranged in one or more lens groups. Often, at least one lens group is involved with focusing an image. This lens group, or focusing lens group, is often attached to a lens driver. Also, in the case of zoom lenses, a lens group provides the magnification of the image. The zoom lens group is attached to the zoom control. Lenses also include a focusing driver that may be attached to the focusing ring for manual focusing or to an auto-focus actuator on the camera body for automatic focusing. The lenses also often contain digital information regarding the type and characteristics of the lens. Still further, the lenses contain aperture controls and irises specific to the requirements of the optical system.

SUMMARY OF THE INVENTION

The present disclosure is directed to an improve camera and lens interface and adjustment system. Parts common to interchangeable lenses of the related art are now included in a separate control module. Such parts can include focusing drivers and irises including aperture controls. The interchangeable lenses of the present disclosure now include the optical systems and electronics that are unique to the lens, and interface with the control module to perform the functions of aperture control and focusing.

In one example, existing camera bodies can be attached to interchangeable control modules in the form of control module barrels. Interchangeable lens barrels are attached to the control module barrel. In another example, a camera body can be manufactured to include the components of the control module, and the lens barrel is attached directly to the camera body. In both cases, however, the lens barrel interfaces with the components of the control module.

DETAILED DESCRIPTION OF PREFERRED EMBODIMENT(S)

This disclosure relates to cameras and interchangeable lens systems. The disclosure, including the figures, describes the cameras and lens systems with reference to several illustrative examples. Other examples are contemplated and are mentioned below or are otherwise imaginable to someone skilled in the art. The scope of the invention is not limited to the few examples, i.e., the described embodiments of the invention. Changes can be made to the examples, including alternative designs not disclosed, and still be within the scope of this disclosure.

A camera, in this disclosure, is a closed box adapted for taking photographs on an inserted sensitized plate, film or other imaging device on which an image is formed when light enters through a lens system and is exposed onto the plate, film or other imaging device. Film, digital, video, and other types of cameras are contemplated to be within the scope of this disclosure. The examples, however, are directed to a single lens reflex type of still camera. Those skilled in the art will understand the teachings of this disclosure can be readily applied to other forms of cameras, and thus be within the scope of the disclosure.

Figure 1:
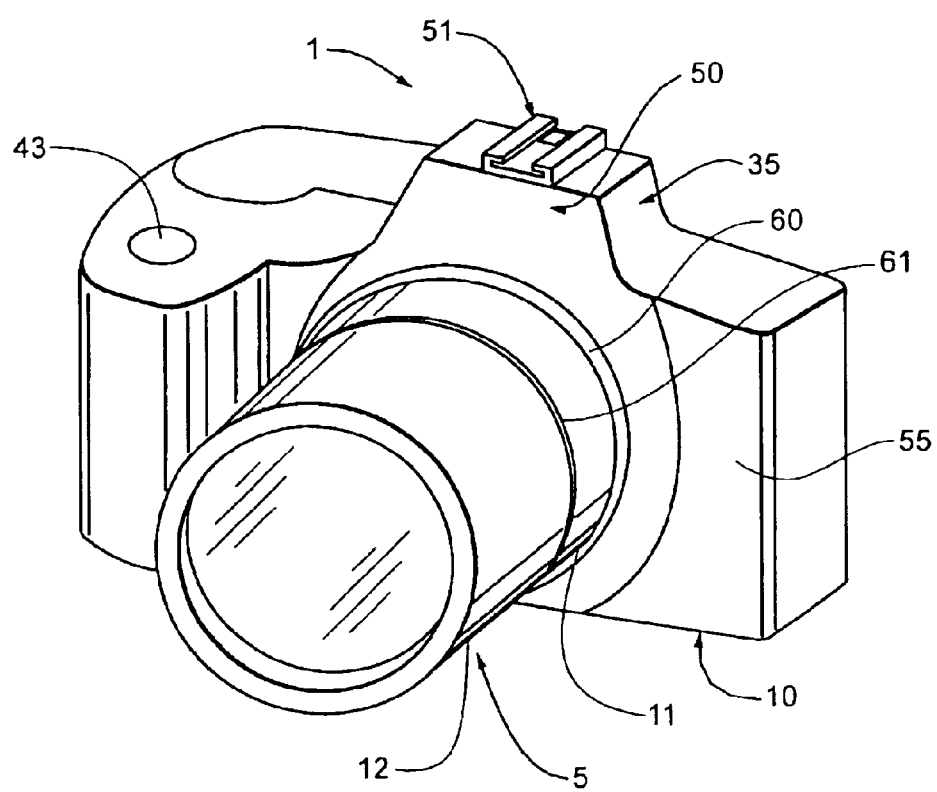
FIG. 1 is a schematic view of a camera and lens system of the present disclosure.

FIG. 1 is a schematic view of a camera 1 and an attached interchangeable lens system 5 in accordance with the present invention. The camera 1 includes a camera body 10 connected to a control module 11. The control module 11 is removably attached to an interchangeable lens barrel 12. The control module 11 can be integrated into the camera body 10 or it can be removably attached to the camera body 10. The control module 11 is adapted to receive the lens barrel 12. Users are able to removably attach a selected lens barrel 12 to the control module 11.

The camera body 10 includes the components and performs the functions of both what is known and yet to be discovered in the art. The camera body 10 in the example includes a mirror box 20 having a main mirror 21. The main mirror 21 is slanted at about a forty-five degree angle with respect to an optical axis 30. The camera body 10 also includes a finder unit 35 disposed above the mirror box 20 (with respect to the optical axis 30). The finder unit 35 includes a pentagonal prism 40 or mirrors and an eyepiece 42. A shutter unit, actuated by a shutter release button 43, and film guide is disposed behind the mirror box 20 (i.e. to the right of the mirror box in the orientation depicted in FIG. 3). The camera body 10 can also include a built in flash unit 50 proximate the finder unit 35, and a flash shoe 51 for connecting to an external flash unit (not shown). The camera body 10 can also contain various electronic and mechanical components and systems for performing functions such as metering, automatic focusing, selecting shutter speed, advancing film, and many other functions consumers, both novice and advanced, have come or will come to expect from the camera body 10.

The camera body 10 is connected to the control module 11. As mentioned above, the control module 11 can be integrated into the camera body 10 or removably attached to the camera body 10. If the control module 11 is integrated, the components of the control module 11 may be selectively disposed within the camera body 10. Alternatively, the control module 11 can be configured as a barrel disposed on the front 55 of the camera body 10. A removable control module 11 can take the form of a barrel that is attached to the camera body 10 via a mount 60. Various types of mounts are well known in the art.

The lens barrel 12 is removably connected to the control module 11 via a mount 61. If the components of the control module 11 are disposed within the camera body 10, the lens barrel 12 can be removably connected to the camera body 10 but interface with the control module 11.

Figure 2:
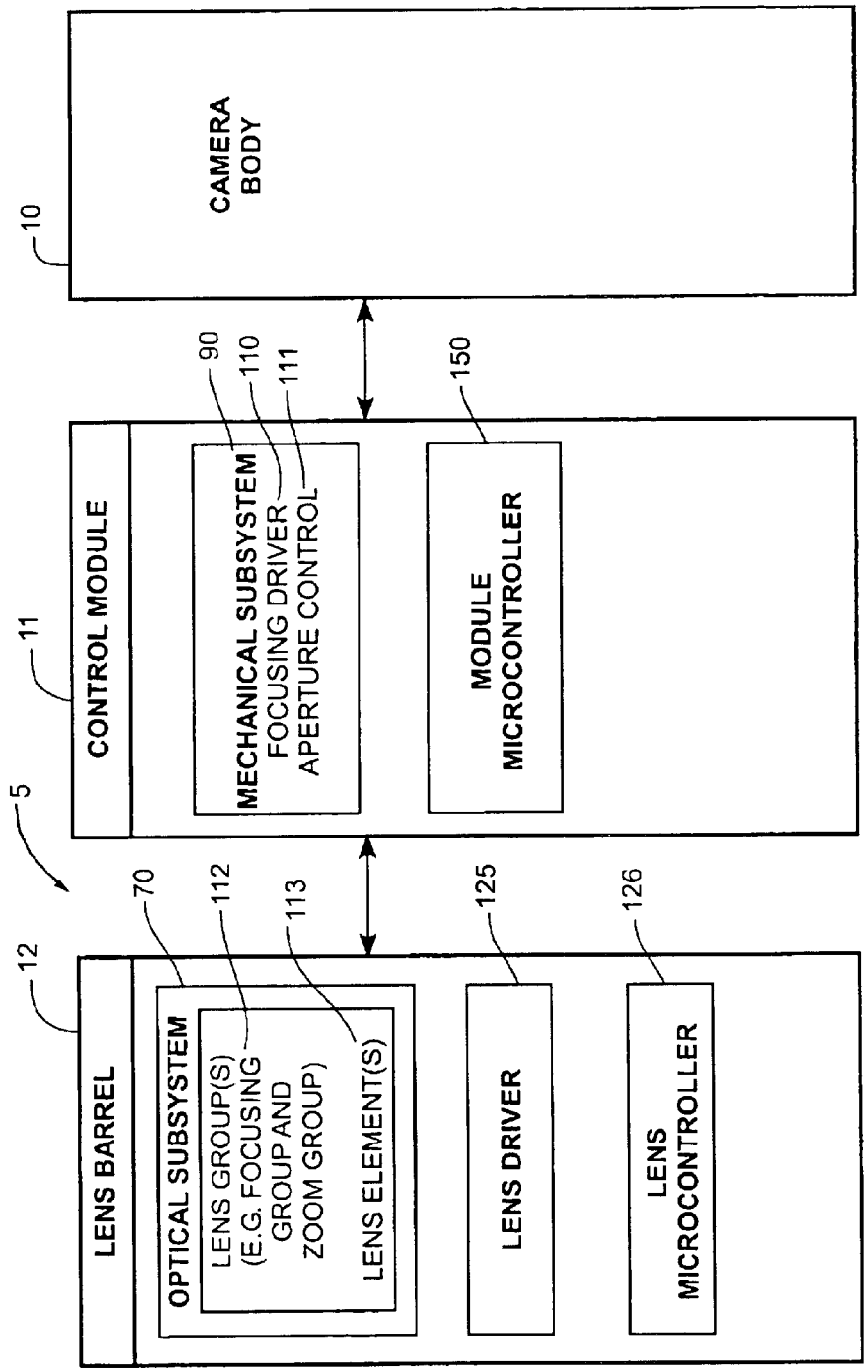
FIG. 2 is a block diagram of the camera and lens system of FIG. 1.

FIG. 2 is a block diagram of the camera and lens system. The lens system typically includes three subsystems, i.e., an optical subsystem 70, an electronics subsystem 80, and a mechanical (or electromechanical) subsystem 90. There isn't necessarily a clear distinction between the subsystems, as they all interact to operate the camera 1. These subsystems are described in relation to FIG. 2.

The lens barrel 12 includes a substantial portion of the optical subsystem 70. The optical subsystem 70 can include at least one, but often more then one, lens groups 112. Each lens group 112 includes at least one lens element 113. Lens elements 113, and lens groups 112, can be described as being either positive or negative, depending on the refraction of the element or group. The elements 113 and groups 112 of an optical subsystem 70 can vary based on lens quality, cost, focal length, maximum operating aperture or iris 120 and other factors. A lens element 113 or one or more lens groups 112 can be movable along the optical axis 30 to properly focus an image on the film or changing the image plane. Other lens elements 113 or lens groups 112 can be immovable relative to the optical axis 30. In the case of zoom lenses, i.e., a lens with a changeable focal length, one or more elements 113 or groups 112 can be moved along the optical axis 30 to change magnification of the image. The lens elements 113 or groups are moved to change focus or focal length with a lens driver 125 that can interface with the control module 11.

The control module 11 includes a substantial portion of the mechanical subsystem 90. Components of the mechanical subsystem 90 include a focusing driver 110 and aperture control 111. In some examples, the control module 11 can also select focal length and cause the lens elements 113 to move. The focusing driver 110 receives an input as to a selected focus setting and causes the movement of the lens elements 113 or groups involved with focusing the image. The aperture control 111 selectively opens and closes the blades of an iris 120 to selectively let in more or less light into the camera body 10 to affect depth of field. Inputs as to focus or aperture can come directly from the user or from the camera body 10.

The electronics subsystem 80 is included in the lens barrel 12 and the control module 11. The electronics subsystem 80 provides information on settings and properties of the other subsystems and interfaces with the electronics on the camera body 10.

Figure 3:
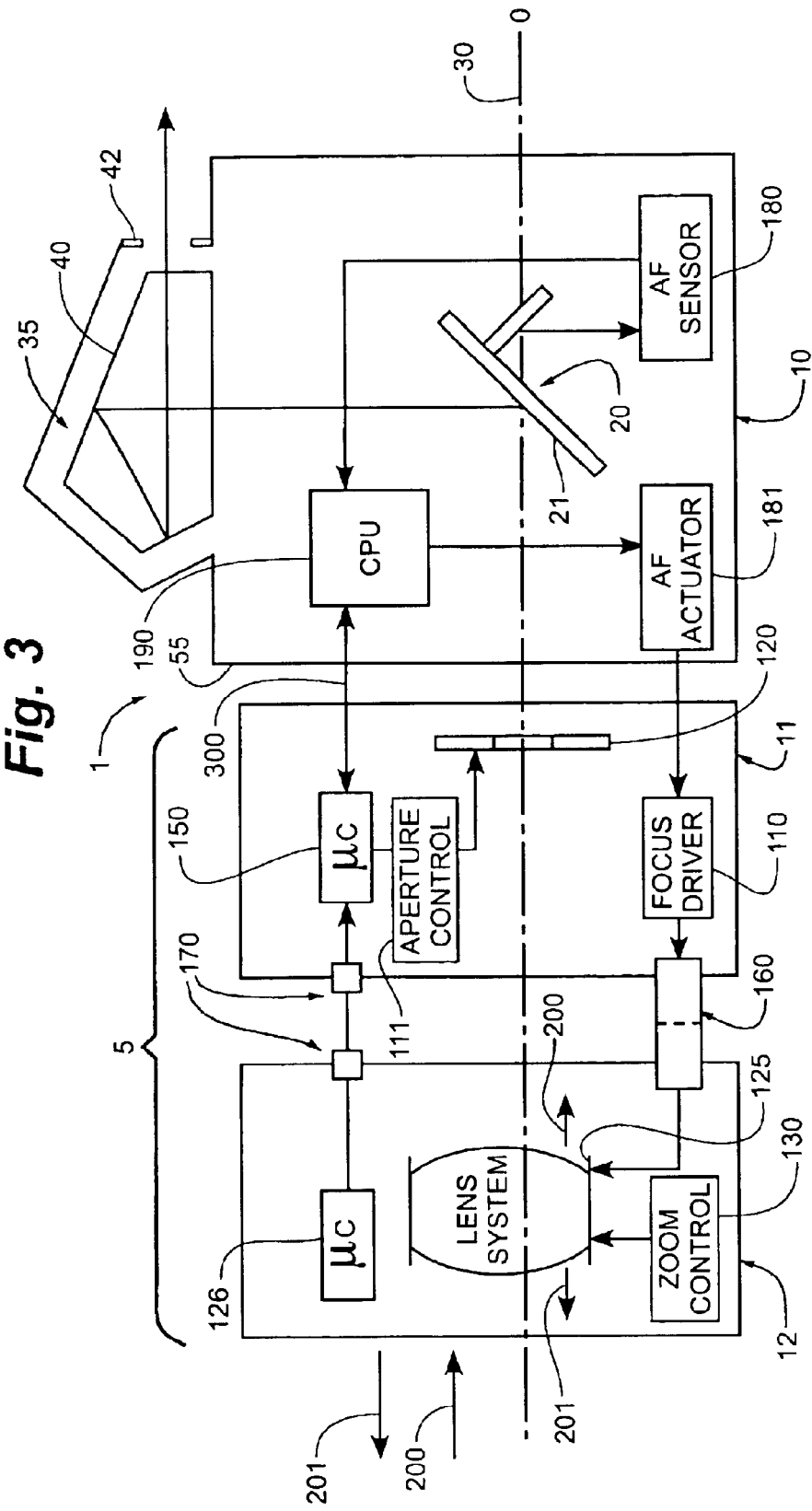
FIG. 3 is a schematic diagram of the camera and lens system of FIG. 1.

FIG. 3 is a schematic side view of the camera and lens system including the lens barrel 12, the control module 11 and the camera body 10. The lens barrel 12 includes the lens elements 113, a lens driver 125, and a lens microcontroller 126. In some examples, the lens barrel 12 can also include a zoom control 130. The control module 11 includes a focusing driver 110, an aperture control 111, an iris 120, and a module microcontroller 150. The mechanical subsystem 90 interfaces with a transmission mechanism 160 coupling the focusing driver 110 with the lens driver 125. The electrical subsystem interfaces with a connection between the lens microcontroller 126 and the module microcontroller 150. The figure depicts the camera body 10 including the mirror box 20, the finder unit 35, an auto-focus sensor 180 and auto-focus actuator 181, and a camera microcontroller 190. The control module 11 interfaces with camera body 10 with the auto-focus actuator 181 coupled to the focusing driver 110. Also, the camera microcontroller 190 interfaces with module microcontroller 150 and the aperture control 111.

Light from an object travels through the lens elements 113, past the iris 120 into the mirror box 20, and through the finder unit 35. A portion of the light entering the mirror box 20 is redirected to the auto-focus sensor 180. The auto-focus sensor 180 determines whether the image is in proper focus and provides an electronic signal to the camera microcontroller. The camera microcontroller 190 communicates electronically with the auto-focus actuator 181. The auto-focus actuator 181 is the first mechanical component in a chain that moves the lens elements 113 to bring the image into proper focus. The auto-focus actuator 181 interfaces with the focusing driver 110 in the control module 11.

The focusing driver 110 in the control module 11 provides precise movement that is ultimately transferred to the focusing group of the lens system. In one example, the focusing driver 110 is connected to the auto-focus actuator 181 by a clutch 220. The clutch 220 is disengaged when a user selects manual focus mode. The focus driver receives rotational forces from the auto-focus actuator 181 (or a focusing ring in manual focus mode) and converts it into a precise motion. In one example, the focusing driver 110 converts the rotational motion into a precise linear motion. The linear motion is ultimately used to reposition the relationship of the focusing group of lens elements 113 so that the focusing operation can be accomplished.

The focusing driver 110 interfaces with the lens barrel 12 via a transmission mechanism 160. The focusing driver 110 is operably coupled to the transmission mechanism 160, and the transmission mechanism 160 is operably coupled to the lens driver 125. The lens driver 125 moves the focusing group of elements either toward the image (i.e. in the direction indicated by arrow 200) or toward the object (i.e. in the direction indicated by arrow 201). In one example, the transmission mechanism 160 converts a linear motion from the focusing driver 110 into another linear motion to the lens driver 125. It is contemplated, however, that the focusing driver 110 can provide a rotational motion to the transmission mechanism 160, and that the transmission mechanism 160 provides either a linear motion or a rotational motion to the lens driver 125. Feedback on focusing is provided with the image projected onto the rangefinder or focusing screen of the camera, or an auto-focus sensor 180, if so equipped.

Figure 4:
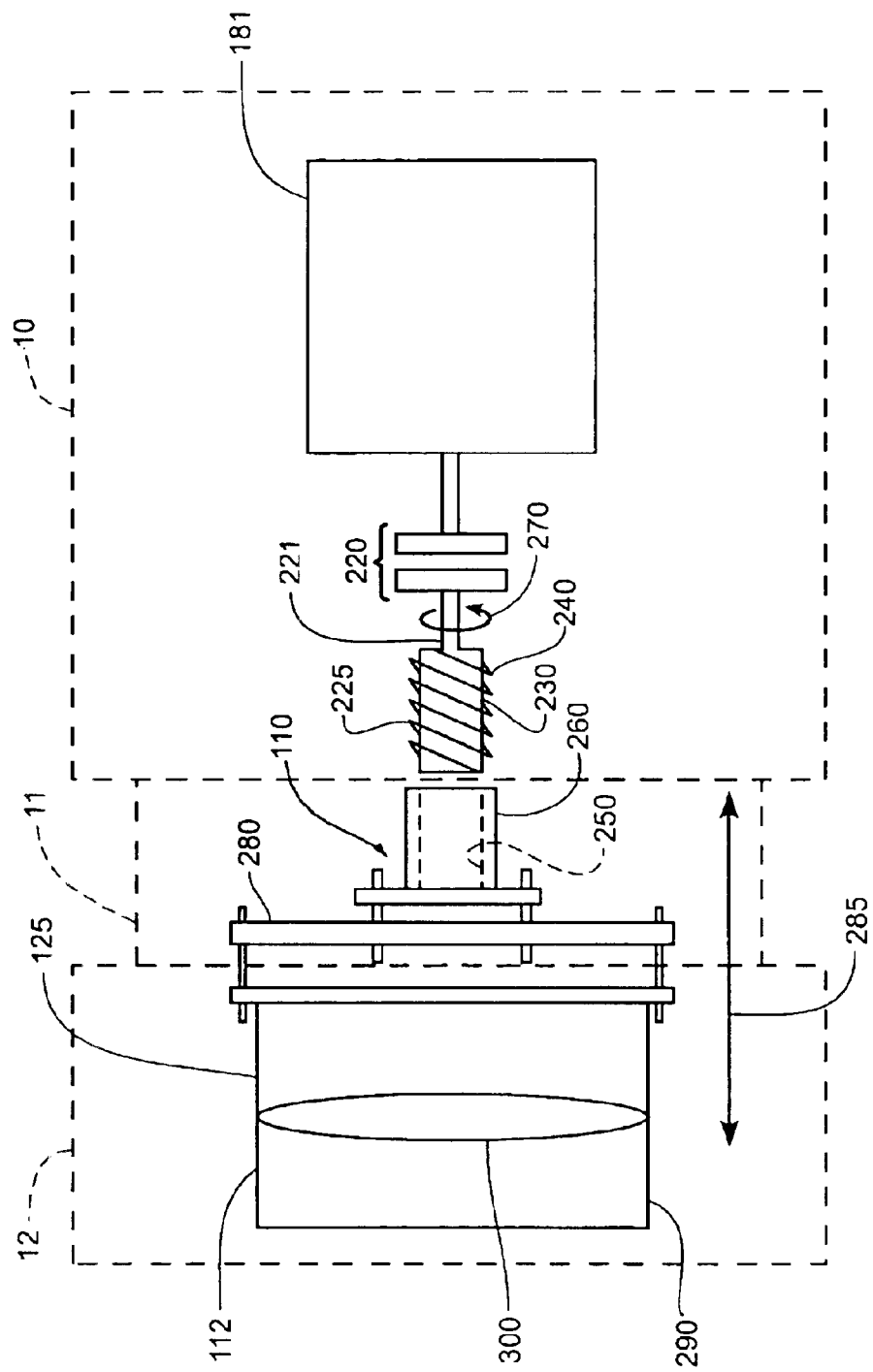
FIG. 4 is a schematic diagram of the transmission system that translates motion from an autofocus actuator in a camera body to a lens system, via a control module.

In one example, depicted in FIG. 4, the auto-focus actuator 181 includes a clutch 220 attached to a shaft 221. The shaft 221 includes a columnar gear 225 operably coupled to the focusing driver 110. The focusing driver 110 includes a gear or gear teeth that mesh with the columnar gear 225. In the example, the gear teeth of the columnar gear are provided on a sleeve 230 including a helicoid thread 240. The helicoid thread 240 is a series of spiral recesses and protrusions. The sleeve 260 interfaces with a helicoid thread 250 on a second sleeve 260, in the example. The rotational movement (i.e. as indicated by arrow 270) of the columnar gear 225 is converted into a linear motion (i.e. as indicated by arrow 285) of the second helicoid sleeve 260 relative to the camera body 10 as the two sleeves 230, 260 are expanded or collapsed in a manner understood in the art. (An example in the art of this cooperation of a threaded member and a tapped sleeve is a screw and nut combination.)

The second helicoid sleeve is used to drive the transmission mechanism 160, which can act as a mechanical interface between the focusing driver 110 and the lens driver 125. In one example, the transmission mechanism 160 is mechanical and includes a translation cam 280 driven by the second helicoid sleeve. The translation cam 280 in the example provides movement along the optical axis 30 in direction 285 without rotating. The translation cam 280 can be coupled to the helicoid driver with flanges or pins. The translation cam 280 can engage the lens driver 125 with a series of pins. The lens driver 125 in one example is a cylinder with open ends having the focusing lens group 112 coupled to the inside of the cylinder. Other transmission mechanisms are contemplated. In one example, the helicoid sleeves are coupled to a linear motor that effects linear movement to the lens driver 125. Still other examples are contemplated.

The microcontrollers 126, 150, 190 provide information and feedback to the electronics in the camera body 10. The microcontroller in the lens barrel 12 provides digital information regarding, for example, the type and characteristics of the lens. For example, the information may include identification that the lens is a 100–300 millimeter zoom lens for use with a maximum aperture of F/5–6.3. This information is provided to the controller on the camera body 10 for performing operations such as setting shutter speeds or apertures based on picture settings. Information regarding maximum aperture is provided either directly to the microcontroller on the control module 11 or indirectly to the control module 11 through the controller on the camera body 10. Although other maximum apertures are possible with the control module 11, the aperture control 111 will not permit the iris 120 to exceed the maximum aperture, or aperture range, of the attached lens barrel 12. Accordingly, the aperture control 111 is universal and can accommodate a wide range of apertures required by the lens barrel 12.

The microcontroller 190 is connected to the control module 11 through an electronic interface 300. The electronic interface 300 can also be electronically coupled to the microcontroller 150 of the control module 11. In an alternative example such as when the control module 11 is integrated into the camera body 10, the electronic interface 300 is electronically coupled to the controller 190 on the camera body 10, and the control module 11 does not include a microcontroller.

The foregoing detailed description and examples have been given for clarity of understanding only. Those skilled in the art will recognize that many changes can be made in the described embodiments without departing from the scope and spirit of the invention. Thus, the scope of the present invention should not be limited to the exact details and structures described herein.

What is claimed is:

1. A camera control module including a focusing driver and an iris, wherein the control module is removably coupleable to a lens barrel having a focusing lens group, said control module containing no lenses.

2. A camera and lens system comprising:

a) a camera body including an auto-focus actuator;

b) a control module including a focus driver and an iris, said control module removably coupled to said camera body with said focus driver operable by said auto-focus actuator, said control module containing no lenses; and c) a lens barrel including a lens group, said lens barrel having no focusing driver and having no iris removably coupled to said control module with said lens group coupled to said focus driver.

\* \* \* \* \*